(12) United States Patent
Kato (10) Patent No.: US 11,095,001 B2
(45) Date of Patent: Aug. 17, 2021

(54) ASSEMBLED BATTERY AND METHOD FOR PRODUCING AN ASSEMBLED BATTERY

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/292,588

(22) Filed: Mar. 5, 2019

(65) Prior Publication Data
US 2019/0280277 A1 Sep. 12, 2019

(30) Foreign Application Priority Data
Mar. 6, 2018 (JP) .............................. JP2018-040000

(51) Int. Cl.
H01M 50/20 (2021.01)
H01M 50/502 (2021.01)
H01M 50/543 (2021.01)

(52) U.S. Cl.
CPC ......... *H01M 50/502* (2021.01); *H01M 50/20* (2021.01); *H01M 50/543* (2021.01); *H01M 2220/20* (2013.01)

(58) Field of Classification Search
CPC ...... H01M 2/206; H01M 2/1077; H01M 2/30; H01M 2220/20
See application file for complete search history.

(56) References Cited

U.S. PATENT DOCUMENTS

2010/0173190 A1* 7/2010 Tsuchiya ................. H01M 2/08
429/160

FOREIGN PATENT DOCUMENTS

| JP | 2011-249243 A | 12/2011 | |
| JP | 2016-091607 A | 5/2016 | |
| JP | 2017-195056 | * 10/2017 | ............. H01M 2/20 |

* cited by examiner

*Primary Examiner* — Osei K Amponsah
(74) *Attorney, Agent, or Firm* — Sughrue Mion, PLLC (57) ABSTRACT

In an assembled battery 1 disclosed herein, unit cells 10A, 10B are electrically connected to each other by way of bus bars 30 that extend along an array direction X of the unit cells. The bus bars 30 of the assembled battery 1 are each provided with a base 32 in which a plurality of terminal insertion holes 34, into which electrode terminals 12, 14 of the unit cells 10A, 10B are inserted, are formed, and with junction projections 36, which are present along the electrode terminals 12, 14, extending from respective regions of the base 32 adjacent to the terminal insertion holes 34. In the assembled battery 1 disclosed herein, the electrode terminals 12, 14 are in surface contact with the junction projections 36, and tips 12a, 14a of the electrode terminals 12, 14 and tips 36a of the junction projections 36 are welded to each other. As a result, the electrode terminals 12, 14 and the bus bars 30 can be welded to each other while a welding state is checked.

8 Claims, 10 Drawing Sheets

ASSEMBLED BATTERY AND METHOD FOR PRODUCING AN ASSEMBLED BATTERY

CROSS REFERENCE TO RELATED APPLICATIONS

The present application claims priority to Japanese Patent Application No. 2018-40000 filed on Mar. 6, 2018, the entire contents whereof are incorporated into the present specification by reference.

BACKGROUND

1. Technical Field

The present disclosure relates to an assembled battery in which a plurality of unit cells is electrically connected, and to a method for producing the assembled battery.

2. Description of the Related Art

Assembled batteries provided with a plurality of unit cells each being a secondary battery such as a lithium ion secondary battery or nickel-hydride battery, or a power storage element such as a capacitor, are growing in importance as power sources for installation in vehicles or as power sources in for instance personal computers and mobile terminals. In particular, assembled batteries having unit cells of lithium ion secondary batteries that are lightweight and that afford high energy density are preferably used for instance in high-output power sources for installation in vehicles.

The unit cells that make up such assembled batteries are provided with an exterior body that accommodates an electrode body and with electrode terminals of a positive electrode and a negative electrode. For instance, elongate plate-shaped members having conductivity are used in the electrode terminals. A first end of each electrode terminal is connected to an electrode body inside the exterior body, while a second end is exposed outside the exterior body. An assembled battery is constructed by arraying a plurality of unit cells having such a structure along a predetermined array direction, and by electrically connecting respective electrode terminals of the unit cells by means of inter-cell connection members (bus bars).

Figure 9:
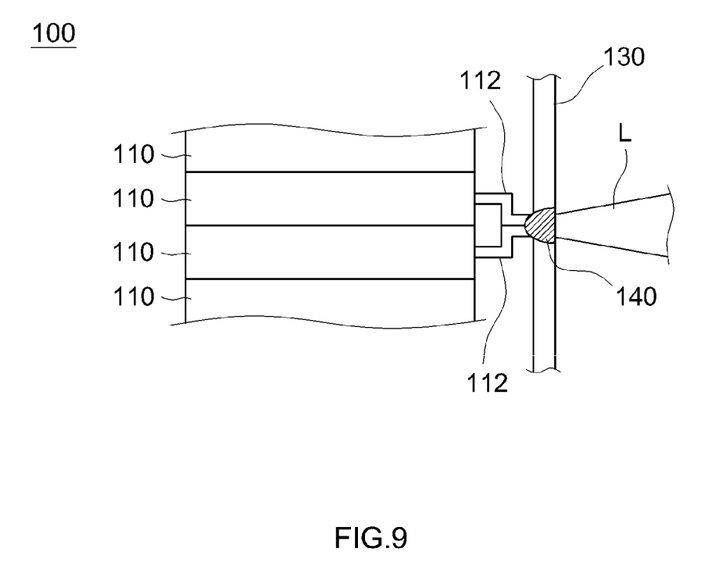
FIG. 9 is a cross-sectional diagram for explaining a connection structure between unit cells in a conventional assembled battery.

FIG. 9 is a cross-sectional diagram for explaining a connection structure between unit cells in a conventional assembled battery. In an assembled battery 100 having the structure illustrated in FIG. 9 plate-like electrode terminals 112 are bent, and respective electrode terminals 112 are brought into surface contact between respective adjacent unit cells 110. Plate-shaped bus bars 130 are disposed in the assembled battery 100 in such a way as to cover the tips of the electrode terminals 112. A laser L is projected, from outside the bus bar 130, onto the contact portion of the bus bar 130 and the electrode terminals 112, to form a welding portion 140 so as to straddle the bus bar 130 and the electrode terminals 112. The unit cells 110 become electrically connected as a result via the bus bar 130 and the electrode terminals 112. In the present specification the language "the outer side of the bus bar" denotes the side on which the unit cells are not disposed.

Japanese Patent Application Publication No. 2016-91607 discloses an example of an assembled battery in which multiple unit cells are electrically connected to each other through welding of bus bars and electrode terminals in the above manner.

SUMMARY

In the assembled battery 100 having the structure described above, however, a concern may arise of for instance damage to of the unit cells 110 and occurrence of welding defects in that welding of the bus bar 130 and the electrode terminals 112 is not carried out properly.

Specifically, the unit cells 110 might become irradiated with the laser L, penetrating through the bus bar 130 and the electrode terminals 112, in a case where the output of the laser L is excessively large and/or in a case where the thickness of the bus bar 130 is excessively small, during welding of the bus bar 130 and the electrode terminals 112. The unit cells 110 might be damaged in such a case on account of the heat from the laser L. Conversely, the laser L may fail to penetrate through the bus bar 130, and the welding portion 140 straddling the electrode terminals 112 and the bus bar 130 may fail to be formed, in a case where the output of the laser L is excessively small and/or the thickness of the bus bar 130 is excessively large. Connection defects may occur in such cases.

In this assembled battery 100, moreover, respective electrode terminals 112 are brought into surface contact between respective adjacent unit cells 110. When gaps appear between the electrode terminals 112, however, the unit cells 110 may become irradiated by the laser L passing through the gaps, and the unit cells 110 may be damaged on account of heat from the laser L.

It is a main object of the present disclosure, arrived at in order to solve the above problems, to provide art that allows properly welding bus bars and electrode terminals and suitably preventing damage to unit cells and welding defects.

In order to attain the above goal, the present disclosure provides an assembled battery having the features below.

The assembled battery disclosed herein is provided with a plurality of unit cells arrayed along a predetermined array direction, and plate-shaped bus bars, which extend in an array direction of the unit cells, electrically connecting respective unit cells to each other. Each unit cell of the assembled battery has an electrode body, an exterior body that accommodates the electrode body, and electrode terminals, which are conductive plate-shaped members, having a first end connected to the electrode body in the interior of the exterior body, and a second end protruding outside the exterior body. Each bus bar is provided with a plate-shaped base in which a plurality of terminal insertion holes, into which the electrode terminals of the respective unit cells are inserted, are formed, and with plate-shaped junction projections, which are present along the electrode terminals of the unit cells, extending from respective regions of the base adjacent to the terminal insertion holes. In the assembled battery disclosed herein, the plate-shaped electrode terminals inserted into the terminal insertion holes are in surface contact with the plate-shaped junction projections, and tips of the electrode terminals and tips of the junction projections are welded to each other.

The inventors conducted various studies in order to solve the above problems. As a result, the inventors speculated that the impossibility of checking a welding state from outside the bus bars may be an underlying cause of damage to the unit cells and of welding defects during welding of the electrode terminals and the bus bars.

For instance, to properly weld each bus bar 130 and the electrode terminals 112 in the assembled battery 100 having the structure illustrated in FIG. 9 it is necessary to adjust the irradiation conditions of the laser L in such a manner that the laser L penetrates through the bus bar 130 but does not penetrate through the electrode terminals 112. However, the bus bar 130 in the assembled battery 100 is disposed so as to cover the electrode terminals 112, and accordingly the welding state cannot be checked from outside the bus bar 130. As a result, the irradiation condition of the laser L is difficult to adjust properly, and the unit cells 110 may be damaged readily due to an excessively strong laser L; alternatively, connection defects can readily occur due to an excessively weak laser L. It is further not possible to recognize a situation, if any such arises, where the pair of electrode terminals 112 is not in proper surface contact, and that a gap has formed between the electrode terminals 112. In that case there is a higher likelihood of damage to the unit cells 110, due to the laser L passing through the gap between electrode terminals 112.

In an assembled battery 100 of conventional structure, thus, a concern arises of damage to the unit cells 110 and of welding defects due to the fact that the state of welding cannot be checked from outside the bus bars 130.

On the basis of that finding, the inventors speculated that various problems that may occur during welding of the electrode terminals and the bus bars could be solved if it were possible to check the welding state, from outside bus bars, during welding of the electrode terminals and the bus bars. The inventors conceived of the structure of the assembled battery disclosed herein upon further study based on that approach.

In the assembled battery disclosed herein, terminal insertion holes into which electrode terminals of unit cells are inserted, and plate-shaped junction projections extending along plate-shaped electrode terminals that are inserted into the terminal insertion holes, are formed in the base of bus bars. In this assembled battery, the junction projections of the bus bars and the electrode terminals of the unit cells are in surface contact with each other, and tips of the electrode terminals and tips of the junction projections are welded to each other.

In an assembled battery of such structure the welding portions of the electrode terminals and the bus bars are disposed on the outside of each bus bar, and accordingly welding can be carried out while the welding state is checked. As a result, the electrode terminals and the bus bars can be welded while welding conditions are adjusted properly. Even if gaps arise between the junction projections and the electrode terminals, such gaps can be recognized and the positions of the junction projections and the positions of the electrode terminal can be corrected prior to welding.

In the assembled battery disclosed herein, therefore, the bus bars and the electrode terminals can be welded properly, and damage to the unit cells and welding defects can be suitably prevented.

In a preferred implementation of the assembled battery disclosed herein, holding projections contacting the base of each bus bar are formed in the unit cells, and the tips of the electrode terminals and the tips of the junction projections are adjacent to each other when the holding projections and the base are brought into contact with each other.

The inventors arrived at the present implementation upon further study aimed at allowing bus bars and electrode terminals to be welded yet more suitably.

Specifically, if the height positions of the tips of the electrode terminals and of the tips of the junction projections become offset from each other during welding of the bus bars and the electrode terminals, a concern arises in that it becomes difficult to form welding portions that straddle the tips of the electrode terminal and the tips of the junction projections.

In the assembled battery of the present embodiment, devised in order to solve such a problem, holding projections that come into contact with the base of the bus bars are formed in the unit cells. As a result, the spacing between the bus bars and the unit cells can be kept constant, and accordingly the height of the tips of the electrode terminals and the height of the tips of the junction projections can be easily brought close to each other. In consequence robustness is enhanced by reliably preventing deviations between the height of the tips of the electrode terminals and the height of the tips of the junction projections, whereby the tips of the electrode terminals and the tips of the junction projections can be welded easily to each other.

In an implementation where the holding projections are provided in the above-described unit cells, the holding projections are preferably plate-shaped members formed adjacent to the electrode terminals.

By forming thus holding projections adjacent to the electrode terminals it becomes possible to even out the heights of the tips of the electrode terminals and of the junction projections more reliably, and robustness during the production of the assembled battery can be suitably enhanced as a result.

In a preferred implementation of the assembled battery disclosed herein, the plurality of terminal insertion holes is formed in a staggered manner, in a plan view.

In the formation of the plurality of terminal insertion holes in the base of the bus bars, the wall thickness of the base between adjacent terminal insertion holes is thin when terminal insertion holes are formed continuously, in a linear fashion, along the array direction of the unit cells. The durability of the bus bars may decrease in such a case. To counter this, the terminal insertion holes in the present implementation are formed in a staggered manner. As a result, it becomes possible to secure sufficient wall thickness of the base between adjacent terminal insertion holes while suppressing drops in the durability of the bus bars.

In a preferred implementation of the assembled battery disclosed herein, the exterior body of the unit cells is a laminate film.

A metal-made case or a resin-made laminate film is used as the exterior body that accommodates the electrode body. Such a laminate film is also advantageous for instance in terms of having a low material cost. However, the rigidity of laminate films is low as compared with those of metal-made cases, and accordingly laminate films are problematic in that the unit cells are difficult to position during arraying of the unit cells. In the assembled battery disclosed herein, by contrast, the individual unit cells can be positioned easily since the electrode terminals are inserted into the terminal insertion holes.

Laminate films have lower heat resistance than metal-made cases. Hence, laminate films are problematic in that the unit cells are readily damaged when the exterior body is irradiated with laser. In the assembled battery disclosed herein, however, welding can be carried out while the welding state is checked, as described above, and therefore the unit cells can be properly prevented from being irradiated with laser.

The assembled battery disclosed herein allows thus suitably preventing the occurrence of various problems that may arise when a laminate film is used in the exterior body.

In another aspect, the present disclosure provides also a method for producing an assembled battery.

The method for producing an assembled battery disclosed herein is a method for producing an assembled battery that is provided with a plurality of unit cells arrayed along a predetermined array direction and with plate-shaped bus bars extending in the array direction of the unit cells and which electrically connect respective unit cells to each other.

The unit cells of the assembled battery produced in accordance with such a production method are provided with an electrode body, an exterior body that accommodates the electrode body, and electrode terminals being conductive plate-shaped members having a first end connected to the electrode body, in the interior of the exterior body, and a second end protruding outside the exterior body. The bus bars of the assembled battery are each provided with a plate-shaped base having formed therein a plurality of terminal insertion holes into which the electrode terminals of the unit cells are inserted; and plate-shaped junction projections extending along the electrode terminals of the unit cells, from respective regions of the base adjacent to the terminal insertion holes. The production method disclosed herein includes a step of inserting the electrode terminals into the terminal insertion holes, and bringing the plate-shaped electrode terminals and the plate-shaped junction projections into surface contact with each other, and a step of welding tips of the electrode terminals and tips of the junction projections to each other.

In the production method disclosed herein the electrode terminals are exposed on the outside of the bus bars, and the tips for the electrode terminals and the tips of the junction projections are welded to each other. As a result, it becomes possible to arrange the welding portions of the electrode terminals and of the bus bars on the outside of the bus bars, and to weld the electrode terminals and the bus bars to each other while the welding state is checked. In consequence, the bus bars and the electrode terminals can be welded properly, and damage to the unit cells and welding defects can be suitably prevented.

In a preferred implementation of the method for producing an assembled battery disclosed herein, the tips of the electrode terminals and the tips of the junction projections are welded to each other by laser.

In cases where it is difficult to check the welding positions of the electrode terminals and the bus bars from outside, there arise for instance various problems of damage to the unit cells and welding defects during laser welding, as described above. In the production method disclosed herein, by contrast, the welding positions of the electrode terminals and the bus bars can be checked from outside, and accordingly problems such as damage to unit cells and welding defects can be suitably prevented.

The means for welding the electrode terminals and the bus bars in the production method disclosed herein is not limited to laser welding, and various welding means, such as ultrasonic welding, can be resorted to. Also, in a case where welding means other than laser welding are resorted to, welding can be carried out while the welding positions of the electrode terminals and the bus bars are checked from outside, and accordingly an effect can be elicited whereby welding defects and the like can be suitably prevented.

DETAILED DESCRIPTION

An example of an assembled battery provided with a plurality of lithium ion secondary as unit cells will be explained below as an assembled battery according to an embodiment of the present disclosure. The unit cells used in the assembled battery disclosed herein are not limited to lithium ion secondary batteries, and for instance secondary batteries such as nickel-hydride batteries and electric storage elements such as capacitors can also be used herein.

In the explanation of the drawings below, members and portions eliciting identical effects will be denoted by identical reference symbols. The dimensional relationships (length, width, thickness and so forth) in the various figures do not reflect actual dimensional relationships. Any features other than the matter specifically set forth in the present specification and that may be necessary for carrying out the present disclosure (for instance materials of an electrode body and a method for producing unit cells) can be regarded as instances of design matter for a person skilled in the art based on known art in the relevant field.

1. Assembled Battery According to Present Embodiment

Figure 1:
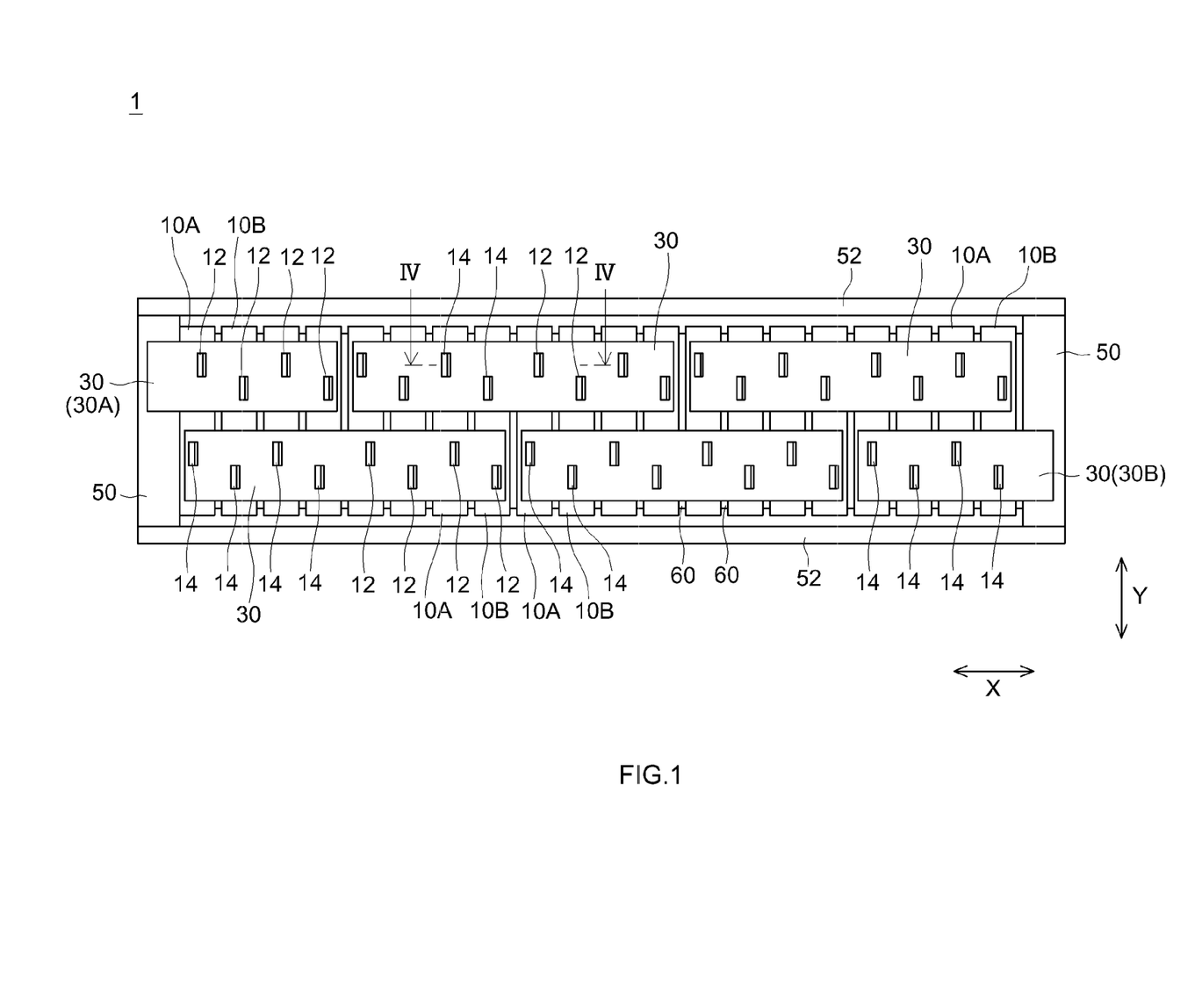
FIG. 1 is a plan-view diagram illustrating schematically an assembled battery according to an embodiment of the present disclosure.

FIG. 1 is a plan-view diagram illustrating schematically an assembled battery according to the present embodiment. The reference symbol X in the figures of the present specification denotes an "array direction of unit cells", the reference symbol Y denotes a "width direction of unit cells", and the reference symbol Z denotes a "height direction of unit cells".

(1) Overall Structure

As illustrated in FIG. 1, an assembled battery 1 according to the present embodiment is provided with a plurality (20 in FIG. 1) of unit cells 10A, 10B. The unit cells 10A, 10B are arrayed along the array direction X. Buffer members 60 are sandwiched between respective arrayed unit cells 10A, 10B. The unit cells 10A, 10B are electrically connected to each other by way of bus bars 30. In the assembled battery 1, restraining plates 50 are disposed on both outer sides in the array direction X. The pair of restraining plates 50 is bridged by restraining bands 52. The unit cells 10A, 10B disposed along the array direction X are restrained as a result by the pair of restraining plates 50.

(2) Unit Cells

Figure 2A:
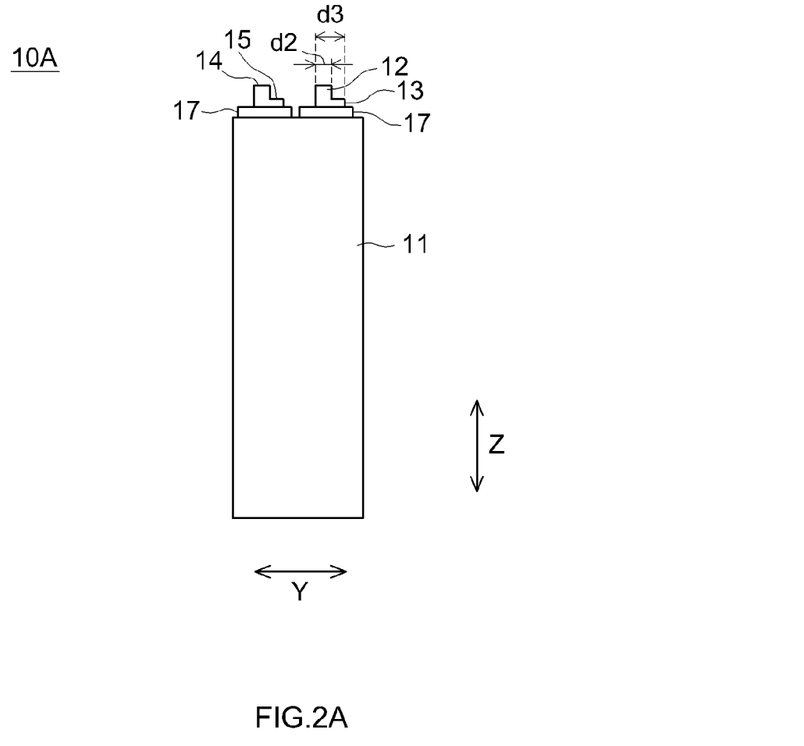
FIG. 2A is a side-view diagram illustrating schematically a unit cell used in an assembled battery according to an embodiment of the present disclosure.
Figure 2B:
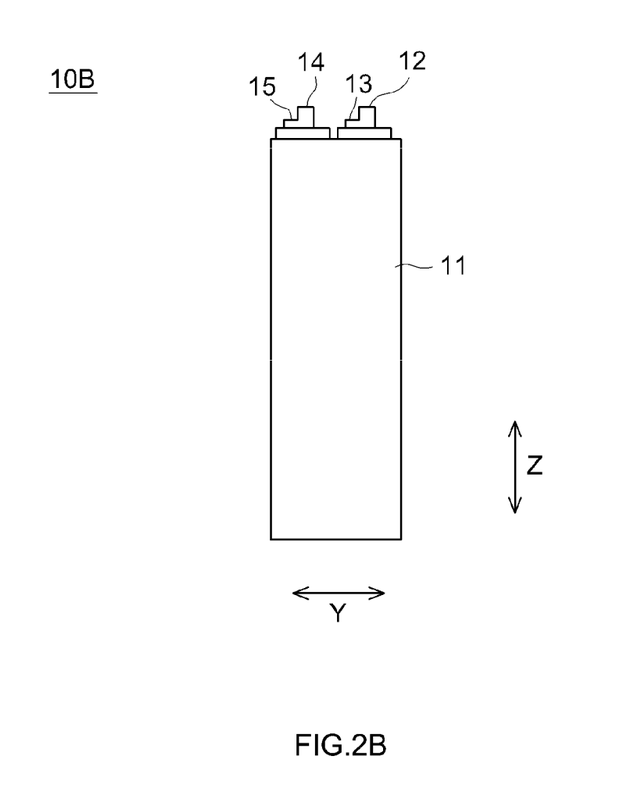
FIG. 2B is a side-view diagram illustrating schematically a unit cell used in an assembled battery according to an embodiment of the present disclosure.

FIG. 2A and FIG. 2B are side-view diagrams illustrating schematically unit cells used in the assembled battery according to the present embodiment. The unit cells 10A, 10B in the present embodiment are each provided with an exterior body 11, as illustrated in FIG. 2A and FIG. 2B. In the present embodiment a laminate film is used as the exterior body 11, with an electrode body and an electrolyte being accommodated in the interior of the laminate film.

Electrode bodies and electrolytes identical to those of conventional ordinary lithium ion secondary batteries can be used, without particular limitations, as the electrode body and electrolyte herein, and therefore a detailed explanation thereof will be omitted herein.

The unit cells 10A, 10B in the present embodiment are each provided with a pair of electrode terminals 12, 14 made up of a positive electrode and a negative electrode. The electrode terminals 12, 14 are conductive elongate plate-shaped members extending along the height direction Z of the unit cells 10A, 10B. Although not depicted in the figures, first ends of the electrode terminals 12, 14 are electrically connected to the electrode body inside the exterior body 11. Further, second ends of the electrode terminals 12, 14 are exposed outside the exterior body 11, as illustrated in FIG. 2A and FIG. 2B. In the unit cells 10A, 10B illustrated in FIG. 2A and FIG. 2B, the electrode terminals denoted by the reference symbol 12 are positive electrode terminals connected to the positive electrodes of the electrode bodies, and the electrode terminals denoted by the reference symbol 14 are negative electrode terminals connected to the negative electrodes of the electrode bodies.

The exterior body 11 of the unit cells 10A, 10B according to the present embodiment is provided with insulating holders 17 that hold the electrode terminals 12, 14 exposed outside the exterior body 11.

In the present embodiment, each of the unit cells 10A, 10B is provided with a plate-shaped holding projection 13 adjacent to the positive electrode terminal 12 and a plate-shaped holding projection 15 adjacent to the negative electrode terminal 14. As will be described in detail further on, a constant spacing d4 (see FIG. 4) between the unit cells 10A, 10B and the bus bars 30 can be kept, and welding of the electrode terminals 12, 14 and the bus bars 30 made easy, by providing such holding projections 13, 15. The holding projections 13, 15 in the present embodiment are formed by notching the ends of the electrode terminals 12, 14 exposed outside the exterior body 11.

In the assembled battery 1 according to the present embodiment, the positions at which the holding projections 13, 15 are formed differ between the unit cell 10A illustrated in FIG. 2A and the unit cell 10B illustrated in FIG. 2B. As will be described in detail further on, by providing two types of unit cells 10A, 10B having thus different positions at which the holding projections 13, 15 are formed it becomes possible to insert the electrode terminals 12, 14 properly into respective terminal insertion holes 34 (see FIG. 3B) that are formed in a staggered manner in the base 32 of the bus bars 30.

(3) Bus Bars

As illustrated in FIG. 1, the assembled battery 1 according to the present embodiment is provided with plate-shaped bus bars 30 that extend along the array direction X of the unit cells 10A, 10B. The unit cells 10A, 10B are connected to each other by way of the bus bars 30.

In the assembled battery 1, eight unit cells 10A, 10B are electrically connected in series by one bus bar 30. Specifically, in the assembled battery 1, the positive electrode terminals 12 of four unit cells 10A, 10B and the negative electrode terminals 14 of four unit cells 10A, 10B are connected by one such bus bar 30. The assembled battery 1 having the unit cells 10A, 10B connected in series is constructed thus through sequential connection of the positive electrode terminals 12 and the negative electrode terminals 14 of the unit cells 10A, 10B. A bus bar (total positive bus bar) 30A connected to only positive electrode terminals 12 is provided at a first end in the array direction X. A bus bar (total negative bus bar) 30B connected to only negative electrode terminals 14 is provided at a second end. The total positive bus bar 30A and the total negative bus bar 30B are connected to an external device, such as the motor of a vehicle.

Figure 3A:
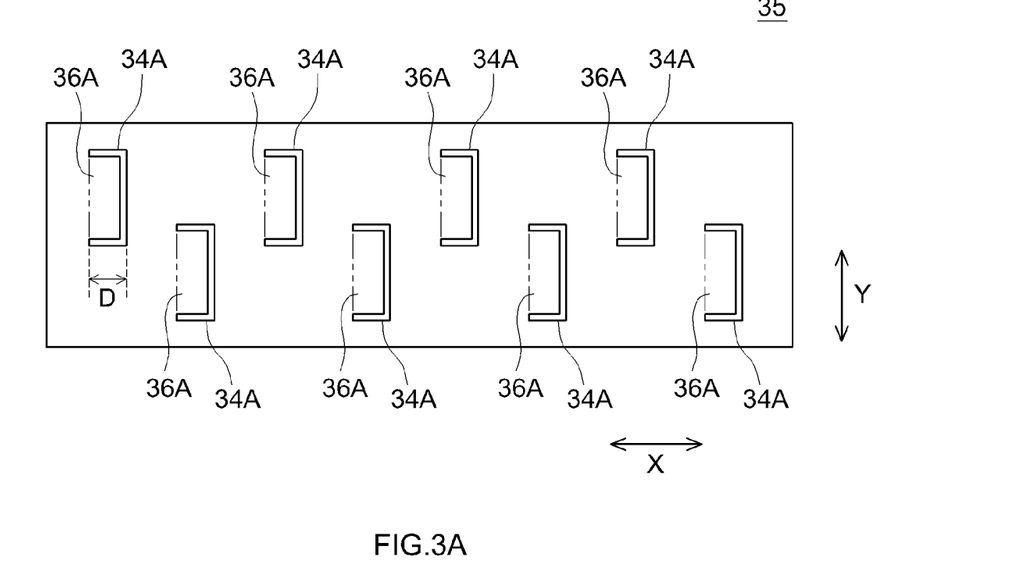
FIG. 3A is a plan-view diagram for explaining a procedure for producing bus bars utilized in an assembled battery according to an embodiment of the present disclosure.
Figure 3B:
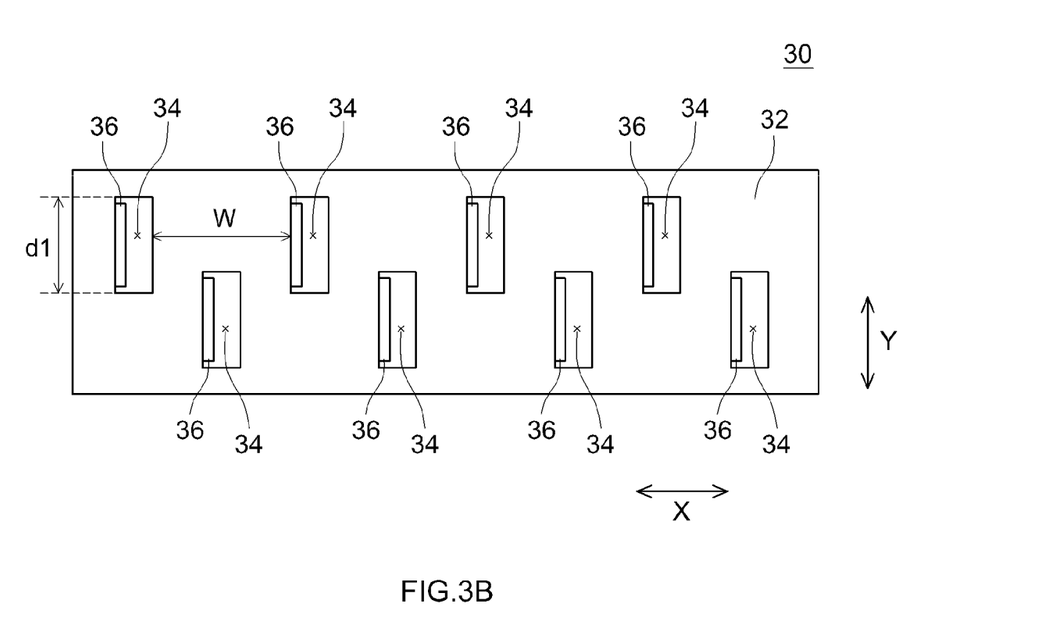
FIG. 3B is a plan-view diagram illustrating a bus bar used in an assembled battery according to an embodiment of the present disclosure.

The concrete structure of the bus bars 30 used in the assembled battery 1 according to the present embodiment will be explained next. The bus bars 30 are each produced through punching of a conductive plate (for instance an aluminum plate or a copper plate) of predetermined rigidity. Specifically, a plurality of U-shaped slits 34A is formed through punching of a conductive plate 35 such as the one illustrated in FIG. 3A, whereupon root portions 36A at regions surrounded by respective slits 34A are bent back. Bus bars 30 such as that illustrated in FIG. 3B are produced as a result. A plurality of terminal insertion holes 34 running through the base 32 are formed in each bus bar 30, and respective junction projections 36 extending in the height direction Z (direction perpendicular to the paper) are each formed at a region adjacent to the terminal insertion holes 34.

In the bus bars 30 of the present embodiment the plurality of terminal insertion holes 34 is formed in a staggered manner, in a plan view. As a result, it becomes possible to sufficiently secure a spacing W between the terminal insertion holes 34, whereby drops in the durability of the bus bars 30 can be suppressed.

(4) Connection Structure of Electrode Terminals and Bus Bars

Figure 4:
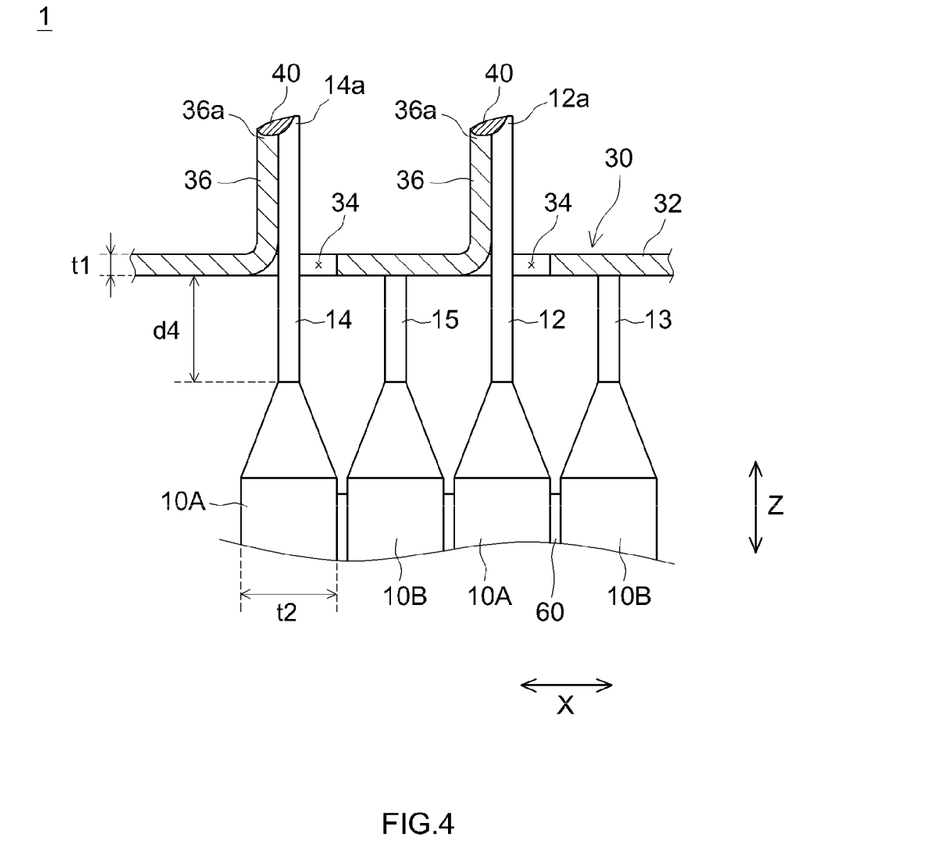
FIG. 4 is a IV-IV cross-sectional diagram in FIG. 1.

An explanation follows next, with reference to FIG. 4, on a connection structure of the electrode terminals 12, 14 and the bus bars 30 in the assembled battery 1 according to the present embodiment. FIG. 4 is a IV-IV cross-sectional diagram in FIG. 1.

In the assembled battery 1 according to the present embodiment, the electrode terminals 12, 14 of the unit cells 10A, 10B are inserted in respective terminal insertion holes 34 of each bus bar 30, as illustrated in FIG. 4. Herein the holding projections 13, 15 come into contact with the base 32 of the bus bar 30. In the present embodiment, specifically, a dimension d1 (see FIG. 3B) of the terminal insertion holes 34 in the width direction Y is set to be larger than a dimension d2 (see FIG. 2A) of the electrode terminals 12, 14 in the width direction Y, and smaller than a total dimension d3 of the electrode terminals 12, 14 plus the holding projections 13, 15. As a result, the electrode terminals 12, 14 can be inserted into respective terminal insertion holes 34, as illustrated in FIG. 4, and the holding projections 13, 15 can be brought into contact with the inward face of the base 32 of the bus bars 30. Through contact of the holding projections 13, 15 against the base 32 of the bus bars 30, a given spacing d4 between the unit cells 10A, 10B and the bus bars 30 can be kept constant.

As described above, plate-shaped junction projections 36 extending in the height direction Z are formed at regions, adjacent to the terminal insertion holes 34, in the base 32 of the bus bars 30 of the present embodiment. In other words, the junction projections 36 extend along the plate-shaped electrode terminals 12, 14 that are inserted into the terminal insertion holes 34, thereby coming into surface contact with the electrode terminals 12, 14. In the assembled battery 1 according to the present embodiment, respective tips 36a, 12a, 14a of the junction projections 36 and of the electrode terminals 12, 14 having been brought into surface contact are laser-welded to each other. Welding portions 40 straddling the junction projections 36 and the electrode terminals 12, 14 become formed as a result.

Although explained in detail in the below-described method for producing an assembled battery, in the assembled battery 1 according to the present embodiment the welding portions 40 that connect the electrode terminals 12, 14 and bus bar 30 can be formed on the outside of the bus bar 30, by adopting the above-described structure. Laser welding can thus be carried out, while the welding state can be checked, by virtue of the fact that the welding portions 40 of the electrode terminals 12, 14 and the bus bar 30 are thus disposed on the outside of the bus bar 30. Accordingly, the present embodiment allows for proper laser welding of the bus bars 30 and the electrode terminals 12, 14, and allows suitably preventing the occurrence of for instance damage to the unit cells 10A, 10B and welding defects.

2. Method for Producing Assembled Battery According to Present Embodiment

Figure 5A:
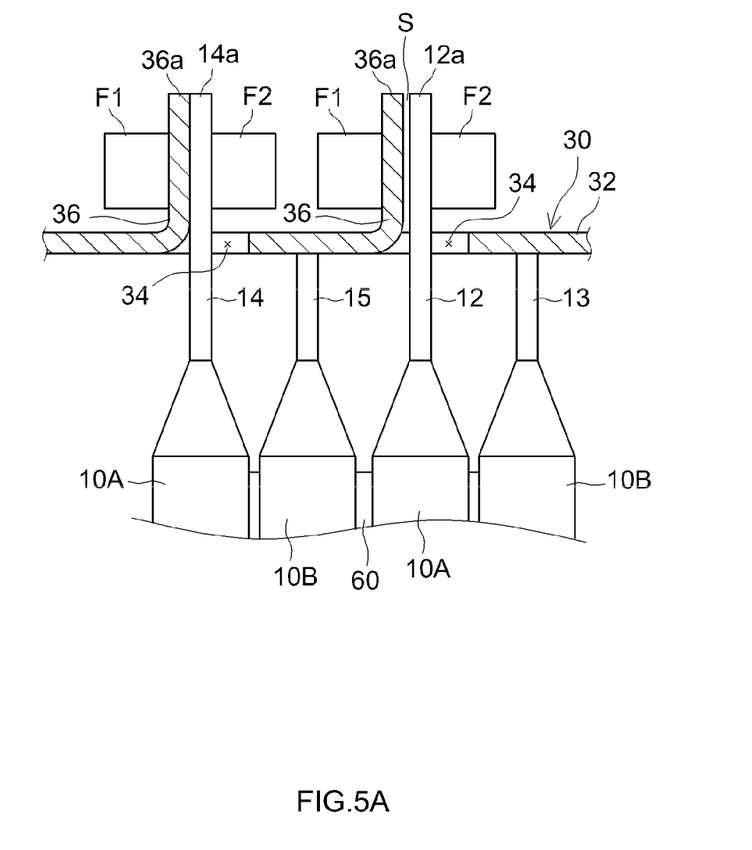
FIG. 5A is a cross-sectional diagram for explaining a method for producing an assembled battery according to an embodiment of the present disclosure.
Figure 5B:
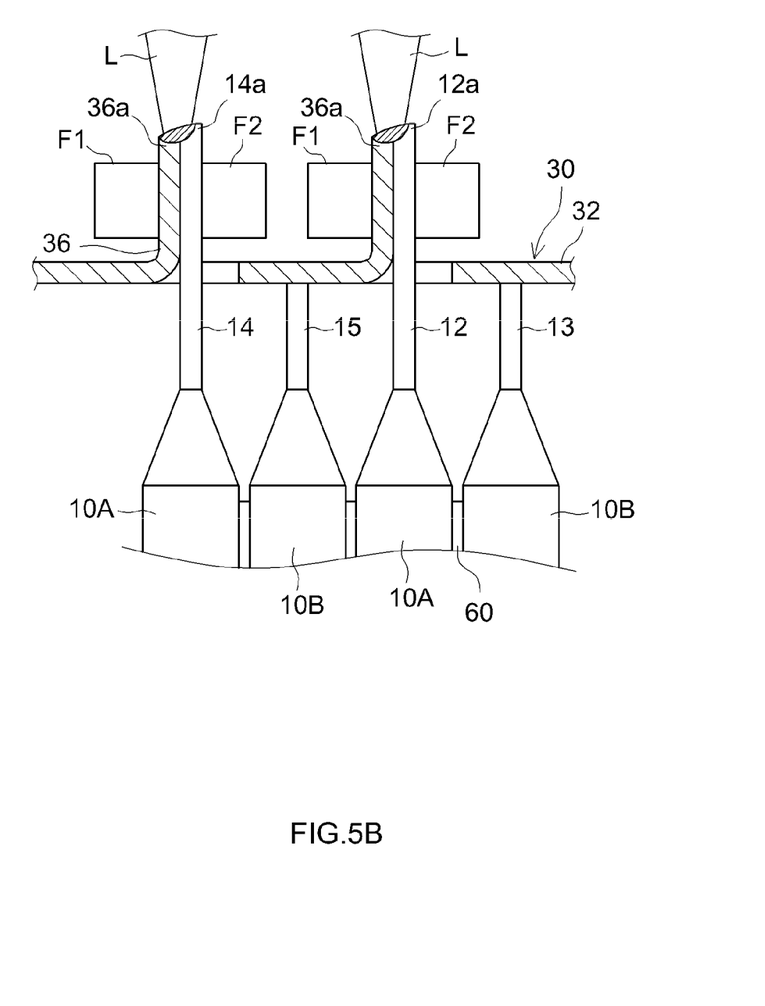
FIG. 5B is a cross-sectional diagram for explaining a method for producing an assembled battery according to an embodiment of the present disclosure.

A method for producing the assembled battery 1 according to the present embodiment described above will be explained next. FIG. 5A and FIG. 5B are cross-sectional diagram for explaining a method for producing an assembled battery according to the present embodiment.

(1) Insertion of Electrode Terminals

As illustrated in FIG. 5A, to produce the assembled battery 1 according to the present embodiment firstly the electrode terminals 12, 14 of the unit cells 10A, 10B are inserted into the terminal insertion holes 34 of the bus bars 30. The electrode terminals 12, 14 inserted in the terminal insertion holes 34 are brought into surface contact with the junction projections 36 and are fixed by a pair of fixing jigs F1, F2. Even when a gap S arises at this time between an electrode terminal 12 and a junction projection 36, the presence of such a gap S can be checked, in the present embodiment, from outside the bus bars 30. Accordingly, the arrangement position of the unit cell 10A can be corrected, so as to eliminate the gap S, prior to the below-described laser welding. It becomes therefore possible to suitably prevent damage to the unit cells 10A, 10B derived from passing of the laser L through the gap S.

(2) Laser Welding

In the present embodiment a laser L is projected onto the tips 12a, 14a of the electrode terminals 12, 14 and the tip 36a of the junction projections 36, as illustrated in FIG. 5B. In a case where the height positions of the tips 12a, 14a of the electrode terminals 12, 14 and of the tip 36a of the junction projections 36 have become offset from each other, the output of the laser L and the welding time are adjusted in such a manner that the tips are welded properly. As a result, the welding portions 40 become formed straddling the tips 12a, 14a of the electrode terminals 12, 14 and the tips 36a of the junction projections 36, and the electrode terminals 12, 14 and the bus bars 30 are welded to each other.

In the present embodiment the tips 12a, 14a of the electrode terminals 12, 14 and the tip 36a of the junction projections 36 are disposed on the outside of the bus bars 30, and accordingly the irradiation condition of the laser L can be adjusted while the welding state is checked. As a result, the laser L can penetrate through the bus bars 30 and the electrode terminals 12, 14, while the unit cells 10A, 10B are reliably prevented from being damaged. Further, welding can be carried out while the welding state is checked, and the positions of the electrode terminals 12, 14 and of the junction projections 36 can be adjusted in such a manner that there arises no gap between welding targets. In consequence, the welding portions 40 straddling the electrode terminals 12, 14 and the junction projections 36 can be formed properly and occurrence of welding defects can be prevented reliably.

In the present embodiment, thus, the welding portions between the electrode terminals 12, 14 and the bus bars 30 can be checked from outside the bus bars 30. As a result, laser welding can be carried out while the welding state is checked, and accordingly the bus bars 30 and the electrode terminals 12, 14 can be welded properly, and occurrence of damage and welding defects in the unit cells 10A, 10B can be suitably prevented.

In the present embodiment, the holding projections 13, 15 in contact with the inner face of the base 32 of the bus bars 30 are formed in each of the unit cells 10A, 10B, as described above. Therefore, the spacing d4 between the bus bars 30 and the unit cells 10A, 10B can be kept constant (see FIG. 4). The heights of the electrode terminals 12, 14 and of the junction projections 36 are set in such a manner that, in this state, the tips 12a, 14a of the electrode terminals 12, 14 and the tip 36a of the junction projections 36 are adjacent to each other. As a result, offset between the heights of the tips of the electrode terminals 14, 16 and of the junction projections 36 can be reliably prevented, and robustness during the production of the assembled battery 1 can be enhanced. In consequence, the electrode terminals 14, 16 and the bus bars 30 can be welded to each other more suitably.

Providing such holding projections 13, 15 allows reliably preventing direct contact between the bus bars 30 and the unit cells 10A, 10B. As a result, the spacing d4 between the bus bars 30 and the unit cells 10A, 10B can be made as small as possible, which can contribute to reducing the size of the assembled battery 1. Further, there is no need for separately providing equipment for securing the spacing d4 between the bus bars 30 and the unit cells 10A, 10B, which can therefore contribute to increasing the manufacturing productivity of the assembled battery 1.

In the present embodiment a laminate film is used as the exterior body 11 of the unit cells 10. Such a laminate film is also advantageous in terms of having a low material cost, but the rigidity of the laminate film is lower than those of metal-made battery cases, and accordingly the laminate film is problematic in that the individual unit cells 10A, 10B are difficult to position. To address this problem, in the present embodiment the electrode terminals 12, 14 are inserted into the terminal insertion holes 34 of the bus bars 30, thanks to which the unit cells 10A, 10B can be positioned easily.

Further, laminate films have lower heat resistance than metal-made cases, and hence are problematic in being more prone to sustaining damage when irradiated with laser. In the present embodiment, however, laser welding can be carried out while the welding state is checked, as described above, and hence situations in which the unit cells 10A, 10B are irradiated with the laser L can be properly prevented.

The present embodiment allows thus properly solving problems derived from the use of a laminate film in the exterior body 11, while reaping only benefits such as low material cost.

The exterior body used in the assembled battery disclosed herein is not limited to a laminate film, and there may be used metal-made battery cases of aluminum or the like.

3. Assembled Battery According to Another Embodiment

The assembled battery 1 according to an embodiment of the present disclosure has been explained above, but the present disclosure is not limited to the embodiment described above, and can accommodate various modifications.

In the embodiment described above there are provided holding projections 13, 15 adjacent to the electrode terminals 14, 16, as illustrated in FIG. 2A and FIG. 2B. Further, the holding projections 13, 15 are brought into contact with the base 32 of the bus bars 30, as illustrated in FIG. 4, as a result of which there is maintained the spacing d4 between the unit cells 10A, 10B and the bus bars 30. However, the structure for maintaining the spacing between the unit cells and the bus bars is not limited to the holding projections described above.

Figure 6:
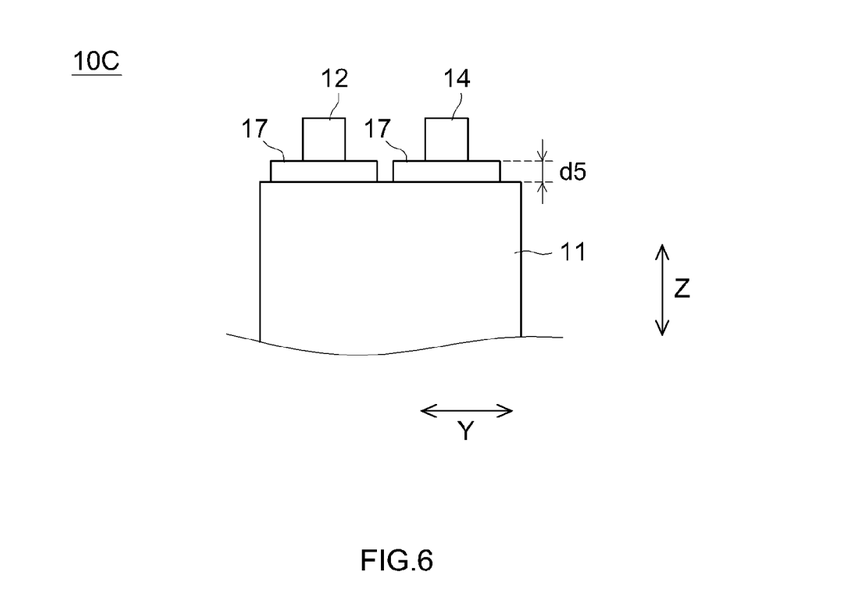
FIG. 6 is a side-view diagram illustrating schematically a unit cell used in an assembled battery according to another embodiment of the present disclosure.

In the case for instance where unit cells 10C are used in which the holding projections are not provided, as illustrated in FIG. 6, a dimension d5 of the insulating holders 17 in the height direction Z may be set to be large, such that the insulating holders 17 come into contact with the base of the bus bars upon insertion of the electrode terminals 12, 14 into the terminal insertion holes of the bus bars. Also, in a case where such a structure is adopted, it becomes possible to easily maintain constant the spacing between the unit cells 10C and the bus bars, and to even out the height of the tips of the electrode terminals 12, 14 and the height of the tips of the junction projections of the bus bars.

A spacer or the like having a predetermined thickness may be separately disposed between the unit cells and the bus bars. In this case as well it becomes possible to easily maintain constant the spacing between the unit cells and the bus bars and to even out the height of the tips of the electrode terminals and the height of the tips of the junction projections of the bus bars.

Herein the structure for maintaining the spacing between unit cells and the bus bars, such as the holding projections and the insulating holders, need not necessarily be provided. For instance, the spacing between the unit cells and the bus bars may be maintained by using a predetermined jig during welding of the electrode terminals and the bus bars, the jig being removed after welding. In this case as well welding can be carried out in a state where the height of the tips of the electrode terminals and the height of the tips of the junction projections of the bus bars are evened out.

In the embodiments described above, the terminal insertion holes 34 are formed in a staggered manner, in a plan view, as illustrated in FIG. 3B. However, the positions at which the terminal insertion holes are formed are not limited to those of the embodiments described above, and can be appropriately modified as needed.

Sufficient spacing can be secured for the terminal insertion holes in the bus bars in the case for instance where the dimension of the unit cells in the array direction is large, or a buffer member of sufficient thickness is disposed between respective unit cells. In this case bus bars can be used in which multiple terminal insertion holes are formed continuously in a linear fashion. More specifically, the terminal insertion holes are preferably formed in such a manner that Expression (1) below is satisfied by the width dimension D (creepage distance from the top end of the junction projections up to the base top face) of sites surrounded by respective slits 34A illustrated in FIG. 3A, a thickness t1 (see FIG. 4) of the base 32, the spacing W between terminal insertion holes, the thickness t2 of the unit cells 10A, 10B, and the number n of unit cells 10A, 10B. The strength of the base can be suitably secured through formation of the bus bars in such a way as to satisfy Expression (1) below.

$$D+t1+W \geq t2 \times n \quad (1)$$

In the embodiments described above, both the positive electrode terminals 12 and the negative electrode terminals 14 are provided at a first end of unit cells 10A, 10B, as illustrated in FIG. 2A and FIG. 2B. The structure of the unit cells, however, is not limited to the embodiments described above, and various structures may be adopted.

Figure 7:
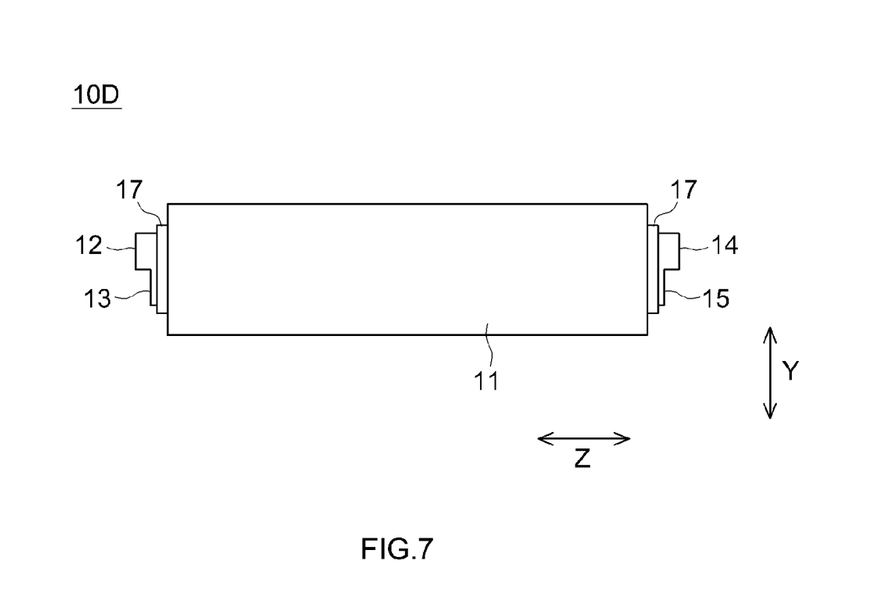
FIG. 7 is a side-view diagram illustrating schematically a unit cell used in an assembled battery according to another embodiment of the present disclosure.
Figure 8A:
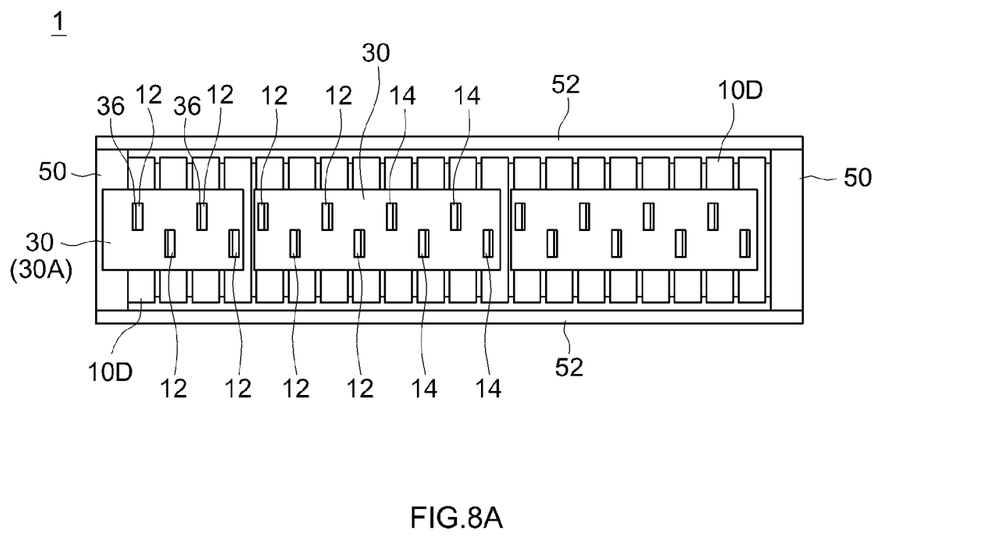
FIG. 8A is a plan-view diagram illustrating schematically an assembled battery constructed using the unit cell illustrated in FIG. 7.
Figure 8B:
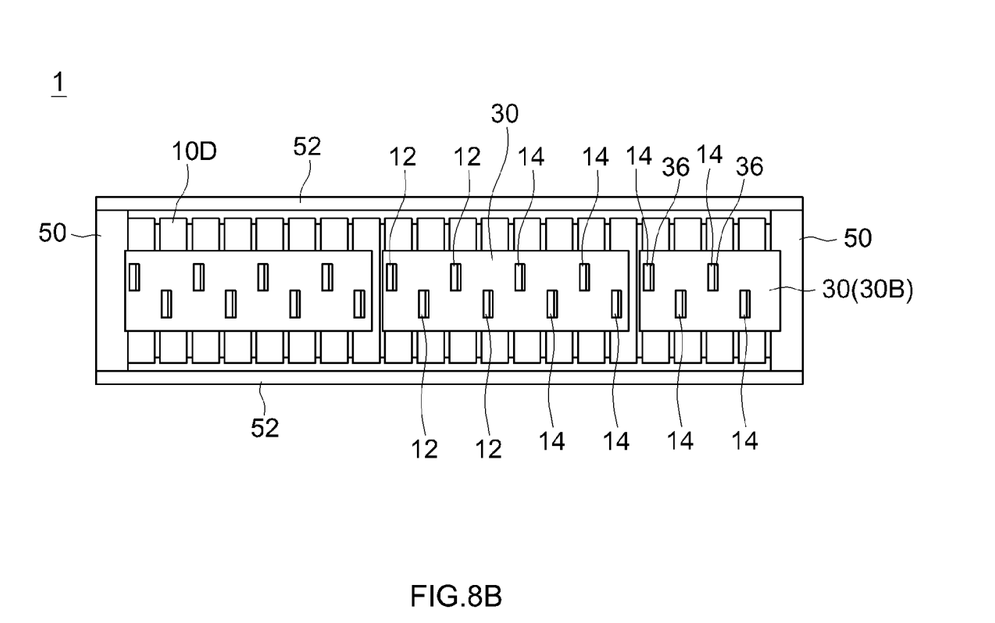
FIG. 8B is a plan-view diagram illustrating schematically an assembled battery constructed using the unit cell illustrated in FIG. 7.

For instance, a unit cell 10D can be used in which an end of the positive electrode terminal 12 is exposed from the first end of the exterior body 11, and an end of the negative electrode terminal 14 is exposed from the second end of the exterior body 11, as illustrated in FIG. 7. In a case where such a unit cell 10 is used, a connection structure relying on bus bars 30 is provided on both faces of the assembled battery 1, as illustrated in FIG. 8A and FIG. 8B. Specifically, total positive bus bars 30A having only the positive electrode terminals 12 of the unit cells 10D connected thereto are provided on a first surface of the assembled battery 1, as illustrated in FIG. 8A. Further, total negative bus bars 30B having only negative electrode terminals 14 connected thereto are provided on the second surface of the assembled battery 1, as illustrated in FIG. 8B. Also, in a case where such a structure is adopted, terminal insertion holes and junction projections 36 are provided in respective bus bars 30, and the tips of the junction projections 36 and the tips of the electrode terminals 12, 14 can be welded to each other. As a result, the bus bars 30 and the electrode terminals 12, 14 can be welded properly, and damage to the unit cells 10D and welding defects can be suitably prevented.

In the embodiments described above, the bus bars and electrode terminals are welded by laser, but the means for welding the bus bars and the electrode terminals is not limited to laser welding.

In the case for instance of ultrasonic welding, a concern may arise in that welding may fail to be accomplished properly on account of gaps appearing between the bus bars and the electrode terminals, if the welding positions of the bus bars and the electrode terminals cannot be checked during welding. In the assembled battery disclosed herein, by contrast, the welding portions of the bus bars and the electrode terminals are disposed on the outside of the bus bars, and therefore ultrasonic welding can be carried out while the welding positions are checked. As a result, it becomes possible to suitably prevent the occurrence of welding defects caused by gaps between the bus bars and the electrode terminals.

Also, in cases where welding means other than laser welding and ultrasonic welding is resorted to, welding can be carried out properly while welding positions are checked, and accordingly it becomes possible to suitably prevent various problems such as welding defects.

Concrete examples of the present disclosure have been explained in detail above, but the examples are merely illustrative in nature, and are not meant to limit the scope of the claims in any way. The features set forth in the claims can accommodate various modifications and alterations of the concrete examples illustrated above.

What is claimed is:

1. An assembled battery comprising:
a plurality of unit cells arrayed along a predetermined array direction; and
plate-shaped bus bars, which extend in the array direction of the unit cells, electrically connecting respective unit cells to each other;
wherein the unit cells each have
an electrode body;
an exterior body that accommodates the electrode body; and
electrode terminals, which are conductive plate-shaped members, having a first end connected to the electrode body in the interior of the exterior body, and a second end protruding outside the exterior body;
the bus bars each have
a plate-shaped base in which a plurality of terminal insertion holes, into which the electrode terminals of the respective unit cells are inserted, are formed; and
plate-shaped junction projections, which are present along the electrode terminals of the unit cells, extending from respective regions of the base adjacent to the terminal insertion holes;
wherein the plurality of terminal insertion holes is formed in a staggered manner, in a plan view, and
wherein the plate-shaped electrode terminals inserted into the terminal insertion holes are in surface contact with the plate-shaped junction projections, and tips of the electrode terminals and tips of the junction projections are welded to each other.

2. The assembled battery according to claim 1, wherein holding projections contacting the base of each bus bar are formed in the unit cells, and the tips of the electrode terminals and the tips of the junction projections are adjacent to each other when the holding projections and the base are brought into contact with each other.

3. The assembled battery according to claim 2, wherein the holding projections are plate-shaped members formed adjacent to the electrode terminals.

4. The assembled battery according to claim 1, wherein the exterior body of the unit cells is a laminate film.

5. A method for producing an assembled battery that is provided with a plurality of unit cells arrayed along a predetermined array direction, and with plate-shaped bus bars, which extend in the array direction of the unit cells, electrically connecting respective unit cells to each other,
wherein the unit cells each have an electrode body, an exterior body that accommodates the electrode body, and electrode terminals, which are conductive plate-shaped members, having a first end connected to the electrode body in the interior of the exterior body, and a second end protruding outside the exterior body;
the bus bars each have a plate-shaped base in which a plurality of terminal insertion holes, into which the electrode terminals of the respective unit cells are inserted, are formed in a staggered manner in a plan view, and plate-shaped junction projections, which are present along the electrode terminals of the unit cells, extending from respective regions of the base adjacent to the terminal insertion holes, the method comprising
a step of inserting the electrode terminals into the terminal insertion holes, and bringing the plate-shaped electrode terminals and the plate-shaped junction projections into surface contact with each other; and
a step of welding tips of the electrode terminals and tips of the junction projections to each other.

6. The method for producing an assembled battery according to claim 5, wherein the tips of the electrode terminals and the tips of the junction projections are welded to each other by laser.

7. The assembled battery according to claim 1, wherein the plurality of terminal insertion holes are formed in a matter satisfying an equation $D+t1+W \geq t2 \times n$, where D is a distance from a top end of the junction projections up to a base top face; W is a space between the terminal insertion holes; t1 is a thickness of the junction projections; t2 is a thickness of the unit cells; and n is a number of unit cells.

8. The method for producing an assembled battery according to claim 5, wherein the plurality of terminal insertion holes are formed in a matter satisfying an equation $D+t1+W \geq t2 \times n$, where D is a distance from a top end of the junction projections up to a base top face; W is a space between the terminal insertion holes; t1 is a thickness of the junction projections; t2 is a thickness of the unit cells; and n is a number of unit cells.

* * * * *